(12) United States Patent
Hyde et al.

(10) Patent No.: US 9,103,899 B2
(45) Date of Patent: Aug. 11, 2015

(54) ADAPTIVE CONTROL OF A PERSONAL ELECTRONIC DEVICE RESPONSIVE TO A MICRO-IMPULSE RADAR

(75) Inventors: Roderick A. Hyde, Redmond, WA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 13/136,405

(22) Filed: Jul. 29, 2011

(65) Prior Publication Data

US 2012/0276849 A1    Nov. 1, 2012

Related U.S. Application Data

(63) Continuation-in-part of application No. 13/136,404, filed on Jul. 29, 2011, now Pat. No. 8,884,809, which is a continuation-in-part of application No. 13/068,049, filed on Apr. 29, 2011, now Pat. No. 9,000,973, which is a continuation-in-part of application No. 13/068,051, filed on Apr. 29, 2011.

(51) Int. Cl.
| | |
|---|---|
| *G01S 13/04* | (2006.01) |
| *G01S 7/00* | (2006.01) |
| *G01S 7/41* | (2006.01) |
| *G01S 13/02* | (2006.01) |
| *G01S 13/50* | (2006.01) |
| *G01S 13/88* | (2006.01) |
| *G01S 13/86* | (2006.01) |

(52) U.S. Cl.
CPC .............. *G01S 7/003* (2013.01); *G01S 7/411* (2013.01); *G01S 13/0209* (2013.01); *G01S 13/04* (2013.01); *G01S 13/50* (2013.01); *G01S 13/88* (2013.01); *G01S 13/867* (2013.01)

(58) Field of Classification Search
CPC ... G01S 15/06; A61B 5/02438; A61B 5/6887
USPC ............................ 342/57, 58, 357.4, 357.25, 342/357.54–357.57
See application file for complete search history.

(56) References Cited

U.S. PATENT DOCUMENTS

| | | |
|---|---|---|
| 4,513,748 A | 4/1985 | Nowogrodzki et al. |
| 4,958,638 A | 9/1990 | Sharpe et al. |

(Continued)

FOREIGN PATENT DOCUMENTS

WO    WO 2008/001092 A2    1/2008

OTHER PUBLICATIONS

Michahelles, F.; Wicki, R.; Schiele, B., "Less contact: heart-rate detection without even touching the user," Wearable Computers, 2004. ISWC 2004. Eighth International Symposium on , vol. 1, No., pp. 4,7, Oct. 31-Nov. 3, 2004.*

(Continued)

*Primary Examiner* — John B Sotomayor
*Assistant Examiner* — Marcus Windrich

(57) ABSTRACT

In an embodiment, a personal electronic device includes a logic circuit and at least one micro-impulse radar operatively coupled to the personal electronic device. The micro-impulse radar is configured to probe a region near the personal electronic device to produce micro-impulse radar data. The logic circuit is configured to provide an operating parameter to the personal electronic device based on the micro-impulse radar data.

19 Claims, 8 Drawing Sheets

(56) References Cited

U.S. PATENT DOCUMENTS

| | | | |
|---|---|---|---|
| 5,361,070 A | 11/1994 | McEwan | |
| 5,507,291 A | 4/1996 | Stirbl et al. | |
| 5,519,400 A | 5/1996 | McEwan | |
| 5,544,661 A | 8/1996 | Davis et al. | |
| 5,579,001 A | 11/1996 | Dempsey et al. | |
| 6,031,454 A * | 2/2000 | Lovejoy et al. | 340/539.29 |
| 6,062,216 A | 5/2000 | Corn | |
| 6,122,537 A | 9/2000 | Schmidt | |
| 6,132,371 A | 10/2000 | Dempsey et al. | |
| 6,295,506 B1 | 9/2001 | Heinonen et al. | |
| 6,315,719 B1 | 11/2001 | Rode et al. | |
| 6,396,416 B1 | 5/2002 | Kuusela et al. | |
| 6,417,797 B1 * | 7/2002 | Cousins et al. | 342/179 |
| 6,454,708 B1 | 9/2002 | Ferguson et al. | |
| 6,456,231 B1 | 9/2002 | McEwan | |
| 6,466,125 B1 | 10/2002 | Richards et al. | |
| 6,535,161 B1 | 3/2003 | McEwan | |
| 6,544,174 B2 | 4/2003 | West et al. | |
| 6,611,783 B2 | 8/2003 | Kelly, Jr. et al. | |
| 6,696,957 B2 | 2/2004 | Shepher | |
| 7,001,334 B2 * | 2/2006 | Reed et al. | 600/300 |
| 7,106,885 B2 | 9/2006 | Osterweil et al. | |
| 7,440,779 B2 | 10/2008 | Kim et al. | |
| 7,567,200 B1 * | 7/2009 | Osterweil | 342/28 |
| 7,650,144 B2 | 1/2010 | Nakamura et al. | |
| 7,753,849 B2 | 7/2010 | Morgan et al. | |
| 7,898,455 B2 * | 3/2011 | Rosenbury | 342/22 |
| 7,916,066 B1 * | 3/2011 | Osterweil | 342/28 |
| 8,004,454 B2 * | 8/2011 | Lindoff et al. | 342/134 |
| 8,052,600 B2 | 11/2011 | Beck et al. | |
| 8,454,528 B2 | 6/2013 | Yuen et al. | |
| 2002/0021231 A1 | 2/2002 | Schlager et al. | |
| 2002/0120184 A1 | 8/2002 | Beck et al. | |
| 2002/0198632 A1 | 12/2002 | Breed et al. | |
| 2003/0135097 A1 | 7/2003 | Wiederhold et al. | |
| 2003/0160701 A1 | 8/2003 | Nakamura et al. | |
| 2004/0027270 A1 | 2/2004 | Fullerton et al. | |
| 2004/0133081 A1 | 7/2004 | Teller et al. | |
| 2004/0249258 A1 | 12/2004 | Tupin, Jr. et al. | |
| 2005/0040230 A1 | 2/2005 | Swartz et al. | |
| 2005/0046569 A1 | 3/2005 | Spriggs et al. | |
| 2005/0046584 A1 * | 3/2005 | Breed | 340/825.72 |
| 2005/0195101 A1 | 9/2005 | Stevens et al. | |
| 2005/0242984 A1 | 11/2005 | Waters | |
| 2006/0001545 A1 | 1/2006 | Wolf | |
| 2006/0061504 A1 | 3/2006 | Leach et al. | |
| 2006/0119473 A1 | 6/2006 | Gunderson et al. | |
| 2006/0195050 A1 | 8/2006 | Alwan et al. | |
| 2006/0209176 A1 | 9/2006 | Nakamura et al. | |
| 2006/0239471 A1 | 10/2006 | Mao et al. | |
| 2006/0253598 A1 | 11/2006 | Nakamura et al. | |
| 2007/0030115 A1 | 2/2007 | Itsuji et al. | |
| 2007/0030156 A1 | 2/2007 | Schlager et al. | |
| 2007/0100666 A1 * | 5/2007 | Stivoric et al. | 705/3 |
| 2007/0176821 A1 | 8/2007 | Flom et al. | |
| 2007/0197881 A1 | 8/2007 | Wolf et al. | |
| 2008/0007445 A1 | 1/2008 | Leach et al. | |
| 2008/0064413 A1 | 3/2008 | Breed | |
| 2008/0071467 A1 | 3/2008 | Johnson et al. | |
| 2008/0082018 A1 | 4/2008 | Sackner et al. | |
| 2008/0088462 A1 | 4/2008 | Breed | |
| 2008/0101329 A1 | 5/2008 | Richards et al. | |
| 2008/0108372 A1 | 5/2008 | Breed | |
| 2008/0117094 A1 | 5/2008 | Lindoff et al. | |
| 2008/0119716 A1 | 5/2008 | Boric-Lubecke et al. | |
| 2008/0167535 A1 | 7/2008 | Stivoric et al. | |
| 2008/0171922 A1 | 7/2008 | Teller et al. | |
| 2008/0238757 A1 | 10/2008 | Lin et al. | |
| 2008/0270172 A1 | 10/2008 | Luff et al. | |
| 2008/0275309 A1 | 11/2008 | Stivoric et al. | |
| 2008/0275349 A1 | 11/2008 | Halperin et al. | |
| 2008/0287751 A1 | 11/2008 | Stivoric et al. | |
| 2008/0287817 A1 | 11/2008 | Stivoric et al. | |
| 2008/0311882 A1 | 12/2008 | Schlager et al. | |
| 2009/0017910 A1 | 1/2009 | Rofougaran et al. | |
| 2009/0052859 A1 | 2/2009 | Greenberger et al. | |
| 2009/0058711 A1 | 3/2009 | Dixon et al. | |
| 2009/0138805 A1 | 5/2009 | Hildreth | |
| 2009/0177068 A1 | 7/2009 | Stivoric et al. | |
| 2009/0215488 A1 | 8/2009 | Causey et al. | |
| 2010/0026550 A1 | 2/2010 | Rosenbury | |
| 2010/0130873 A1 | 5/2010 | Yuen et al. | |
| 2010/0141443 A1 | 6/2010 | Romero et al. | |
| 2010/0198083 A1 | 8/2010 | Lin et al. | |
| 2010/0214149 A1 | 8/2010 | Kuhn | |
| 2010/0240999 A1 | 9/2010 | Droitcour et al. | |
| 2010/0286532 A1 * | 11/2010 | Farringdon et al. | 600/483 |
| 2010/0306388 A1 | 12/2010 | Newville | |
| 2011/0161136 A1 | 6/2011 | Faith et al. | |
| 2011/0166940 A1 | 7/2011 | Bangera et al. | |
| 2011/0237274 A1 | 9/2011 | Wong et al. | |
| 2011/0285579 A1 | 11/2011 | Bangera et al. | |
| 2012/0068876 A1 | 3/2012 | Bangera et al. | |
| 2012/0116202 A1 | 5/2012 | Bangera et al. | |
| 2012/0229304 A1 | 9/2012 | Dalal | |

OTHER PUBLICATIONS

Citation for Michahelles et al.; Published at the Eighth International Symposium on Wearable Computers; Oct. 31-Nov. 3, 2004; pp. 4-7, retrieved on Jul. 18, 2012 from the internet at http://ieeexplore.ieee.org/xpls/abs_all.jsp?arnumber=1364682&isnumber=29895&tag=1.

Michahelles et al.; "Less Contact: Heart-Rate Detection Without Even Touching the User"; Eighth International Symposium on Wearable Computers; bearing a date of 2004; pp. 1-4; vol. 1; located at http://72.52.208.92/~gbpprorg/mil/cavity/iswc04_radar.pdf.

PCT International Search Report; International App. No. PCT/US12/35386; Aug. 13, 2012; pp. 1-3.

European Patent Office, Supplementary European Search Report, Pursuant to Rule 62 EPC; App. No. EP 12777396.8; Sep. 26, 2014 (received by our Agent on Sep. 30, 2014); pp. 1-8.

* cited by examiner

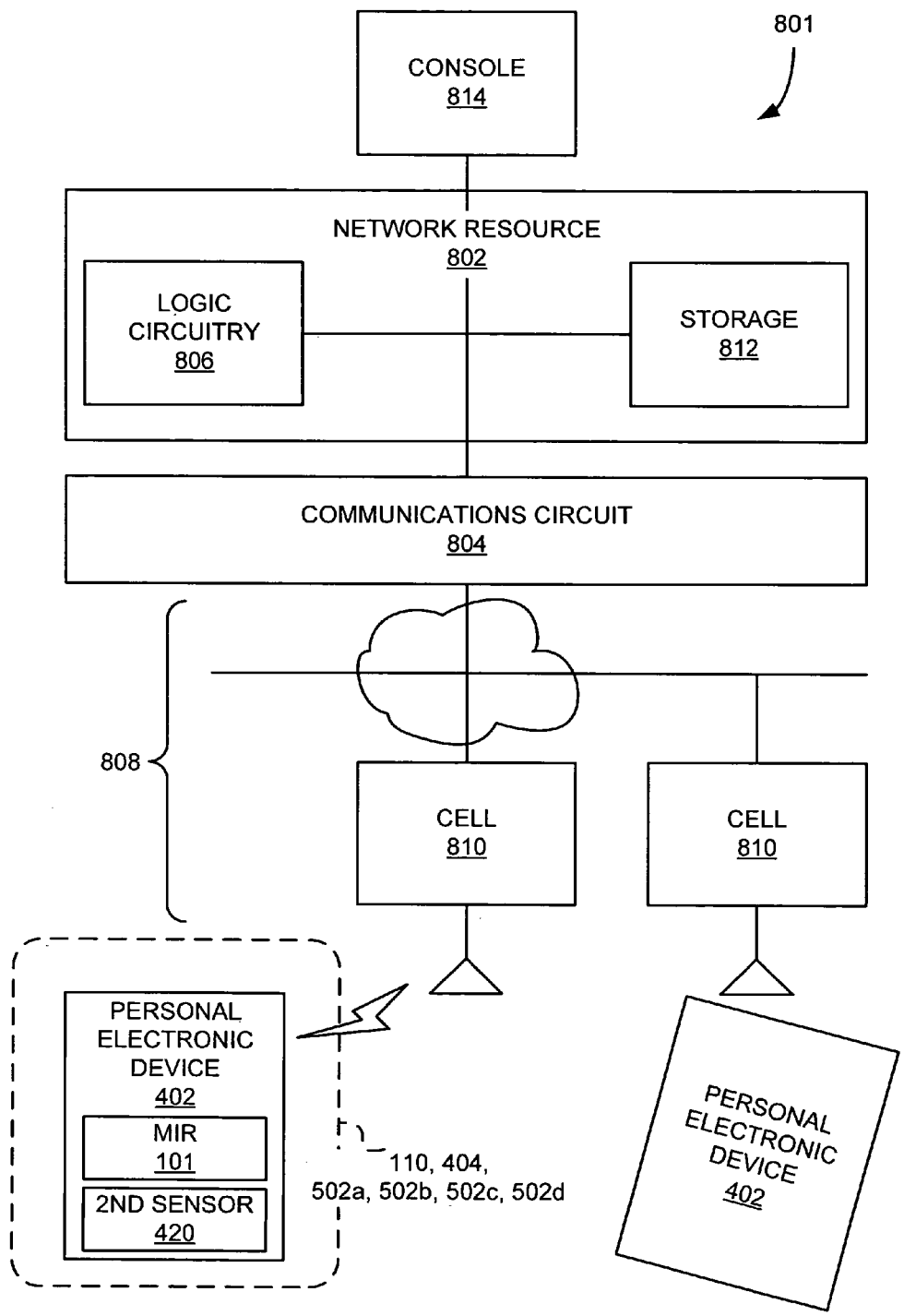

ADAPTIVE CONTROL OF A PERSONAL ELECTRONIC DEVICE RESPONSIVE TO A MICRO-IMPULSE RADAR

RELATED APPLICATIONS

For purposes of the USPTO extra-statutory requirements, the present application constitutes a continuation-in-part of the following United States Patent Applications:

Application Ser. No. 13/136,404, entitled PERSONAL ELECTRONIC DEVICE PROVIDING ENHANCED USER ENVIRONMENTAL AWARENESS, naming Roderick A. Hyde, Jordin T. Kare, and Lowell L. Wood, Jr. as inventors, filed on Jul. 29, 2011, which is filed on the same date as the instant application, or is an application of which a currently co-pending application is entitled to the benefit of the filing date;

Application Ser. No. 13/068,049, entitled PERSONAL ELECTRONIC DEVICE WITH A MICRO-IMPULSE RADAR, naming Roderick A. Hyde, Jordin T. Kare, and Lowell L. Wood, Jr. as inventors, filed on Apr. 29, 2011, which is currently co-pending, or is an application of which a currently co-pending application is entitled to the benefit of the filing date; and Application Ser. No. 13/068,051, entitled NETWORK AND PERSONAL ELECTRONIC DEVICES OPERATIVELY COUPLED TO MICRO-IMPULSE RADARS, naming Roderick A. Hyde, Jordin T. Kare, and Lowell L. Wood, Jr. as inventors, filed on Apr. 29, 2011, which is currently co-pending, or is an application of which a currently co-pending application is entitled to the benefit of the filing date.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a device can include a personal electronic device including a logic circuit and at least one micro-impulse radar (MIR) operatively coupled to the personal electronic device and configured to probe one or more regions near the personal electronic device to produce MIR data. The logic circuit can be configured to provide at least one operating parameter for the personal electronic device responsive to the MIR data.

According to an embodiment, a method can include operating a MIR operatively coupled to a personal electronic device to produce MIR data and at least conditionally performing one or more logic functions to provide at least one operating parameter for the personal electronic device responsive to the MIR data.

According to an embodiment, a non-transitory computer-readable medium can carry computer instructions configured to cause a personal electronic device to execute steps including operating a MIR operatively coupled to a personal electronic device to produce MIR data and at least conditionally performing one or more logic functions to provide at least one operating parameter for the personal electronic device responsive to the MIR data.

According to an embodiment, a system can include a network resource configured to receive MIR data from one or more personal electronic devices. The network resource can include a logic circuit configured to perform one or more logical operations to produce at least one parameter that is a function of the MIR data. The system can also include a communications circuit configured to operatively couple one or more personal electronic devices to the network resource, each personal electronic device being operatively coupled to at least one MIR, and each personal electronic device being configured to transmit the MIR data to the network resource.

According to an embodiment, a method for determining an environment of a personal electronic device can include receiving MIR data from one or more personal electronic devices and storing or transmitting second data including one or more operating parameters corresponding to the received MIR data.

According to an embodiment, a non-transitory computer-readable medium can carry computer instructions configured to cause a network resource to execute steps including receiving MIR data from one or more personal electronic devices and storing or transmitting second data including one or more operating parameters corresponding to the received MIR data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 8 is a block diagram of a system including a network resource configured to be operatively coupled to one or more personal electronic devices including micro-impulse radars, according to an embodiment.

DETAILED DESCRIPTION

Figure 1:
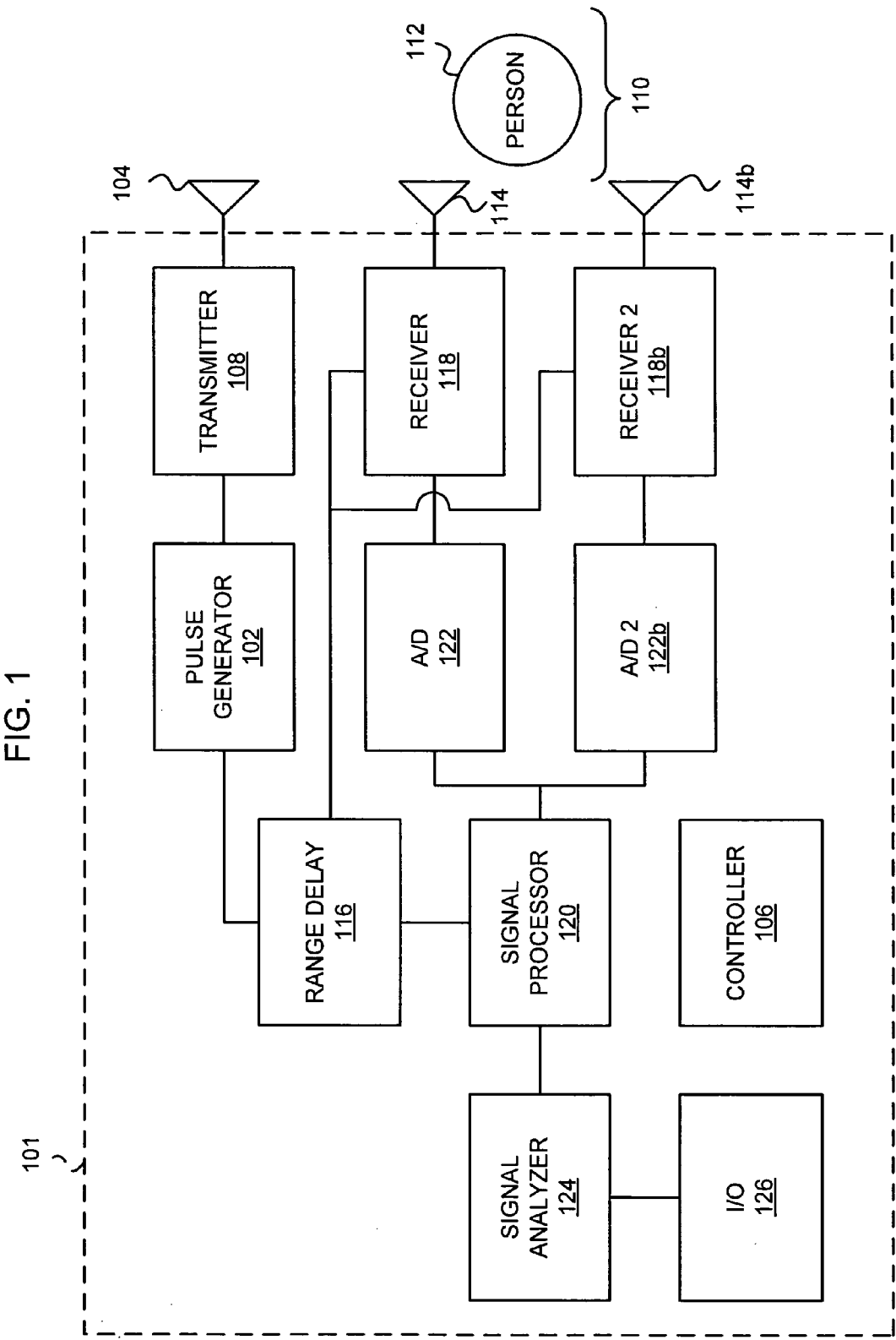
FIG. 1 is a simplified block diagram of a micro-impulse radar (MIR), according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here.

FIG. 1 is a simplified block diagram of a micro-impulse radar (MIR) 101, according to an embodiment. A pulse generator 102 is configured to output a relatively short voltage pulse that is applied to a transmit antenna 104. A typical transmitted pulse width can be between about two hundred picoseconds and about 5 nanoseconds, for example. The voltage pulse can be conditioned and amplified (or attenuated) for output by a transmitter 108. For example, the transmitter 108 can transmit the voltage pulse or can further condition the pulse, such as by differentiating a leading and/or trailing edge to produce a short sub-nanosecond transmitted pulses. The voltage pulse is typically not modulated onto a carrier frequency. Rather, the voltage pulse transmission spectrum is the frequency domain transform of the emitted pulse. The MIR 101 can probe a region 110 by emitting a series of spaced voltage pulses. For example, the series of voltage pulses can be spaced between about 100 nanoseconds and 100 microseconds apart. Typically, the pulse generator 102 emits the voltage pulses with non-uniform spacing such as random or pseudo-random spacing, although constant spacing can be used if interference or compliance is not a concern. Spacing between the series of voltage pulses can be varied responsive to detection of one or more persons 112 in the region 110. For example, the spacing between pulses can be relatively large when a person 112 is not detected in the region 110. Spacing between pulses can be decreased (responsive to one or more commands from a controller 106) when a person 112 is detected in the region 110. For example, the decreased time between pulses can result in faster MIR data generation for purposes of more quickly determining information about one or more persons 112 in the region 110. The emitted series of voltage pulses can be characterized by spectral components having high penetration that can pass through a range of materials and geometries in the region 110.

An object 112 (such as a person) in the probed region 110 can selectively reflect, refract, absorb, and/or otherwise scatter the emitted pulses. A return signal including a reflected, refracted, absorbed, and/or otherwise scattered signal can be received by a receive antenna 114. Optionally, the receive antenna 114 and transmit antenna 104 can be combined into a single antenna. In a single antenna embodiment, a filter (not shown) can be used to separate the return signal from the emitted pulse.

A probed region 110 can be defined according to an angular extent and distance from the transmit antenna 104 and the receive antenna 114. Distance can be determined by a range delay 116 configured to trigger a receiver 118 operatively coupled to the receive antenna 114. For example, the receiver 118 can include a voltage detector such as a capture-and-hold capacitor or network. The range delay corresponds to distance into the region 110. Range delay can be modulated to capture information corresponding to different distances.

A signal processor 120 can be configured to receive detection signals or data from the receiver 118 and the analog to digital converter 122, and by correlating range delay to the detection signal, extract data corresponding to the probed region 110 including the object 112.

Optionally, the MIR 101 can include a second receive antenna 114b. The second receive antenna can be operatively coupled to a second receiver 118b coupled to an output of the range delay 116 or a separate range delay (not shown) configured to provide a delay selected for a depth into the region 110. The signal processor 120 can further receive output from a second A/D converter 122b operatively coupled to the second receiver 118b.

The signal processor 120 can be configured to compare detection signals received by the antennas 114, 114b. For example, the signal processor 120 can search for common signal characteristics such as similar reflected static signal strength or spectrum, similar (or corresponding) Doppler shift, and/or common periodic motion components, and compare the respective range delays corresponding to detection by the respective antennas 114, 114b. Signals sharing one or more characteristics can be correlated to triangulate to a location of one or more objects 112 in the region 110 relative to known locations of the antennas 114, 114b. The triangulated locations can be output as computed ranges of angle or computed ranges of extent.

For example, a first signal corresponding to a reflected pulse received by an antenna element 114 can be digitized by an analog-to-digital converter (A/D) 122 to form a first digitized waveform. A second signal corresponding to the reflected pulse received by a second antenna element 114b can similarly be digitized by and A/D 122b (or alternatively by the same A/D converter 122) to form a second digitized waveform. The signal processor 120 can compare the first and second digitized waveforms and deduce angular information from the first and second digitized waveforms and known geometry of the first and second antenna elements.

A second pulse can be received at a second range delay 116 value and can be similarly signal processed to produce a second set of angular information that maps a second surface at a different distance. Depth within a given range delay can be inferred from a strength of the reflected signal. A greater number of signals can be combined to provide additional depth information. A series of pulses can be combined to form a time series of signals corresponding to the object 112 that includes movement information of the object 112 through the region 110. The object 112 described herein can include one or more persons.

The signal processor 120 outputs MIR data. The MIR data can include object location information, object shape information, object velocity information, information about inclusion of high density and/or conductive objects such as jewelry, cell phones, glasses including metal, etc., and physiological information related to periodic motion. The MIR data can include spatial information, time-domain motion information, and/or frequency domain information. Optionally, the MIR data can be output in the form of an image. MIR data in the form of an image can include a surface slice made of pixels or a volume made of voxels. Optionally, the image can include vector information.

The MIR data from the signal processor 120 is output to a signal analyzer 124. The signal analyzer 124 can be integrated with the signal processor 120 and/or can be included in the same MIR 101, as shown. Alternatively, the signal processor 120 can output MIR data through an interface to a signal analyzer 124 included in an apparatus separate from the MIR 101.

A signal analyzer 124 can be configured to extract desired information from MIR data received from the signal processor 120. Data corresponding to the extracted information can be saved in a memory for access by a data interface 126 or can be pushed out the data interface 126.

The signal analyzer 124 can be configured to determine the presence of a person 112 in the region 110. For example MIR data from the signal processor can include data having a static spectrum at a location in the region 110, and a periodic motion spectrum corresponding to the location characteristic of a human physiological process (e.g. heartbeat and/or breathing). From the correspondence of such MIR data, it can be deduced that a person 112 is at the location in the region 110. The signal analyzer 124 can be configured to determine a number of persons 112 in the region 110. The signal analyzer 124 can be configured to determine the size of a person and/or relative size of anatomical features of a person 112 in the region 110. The signal analyzer 124 can be configured to determine the presence of an animal 112 in the region 110. The signal analyzer 124 can be configured to determine movement and/or speed of movement of a person 112 through the region 110. The signal analyzer 124 can be configured to determine or infer the orientation of a person 112 such as the direction a person is facing relative to the region 110. The signal analyzer 124 can be configured to determine one or more physiological aspects of a person 112 in the region 110. The signal analyzer 124 can determine presence of a personal appliance such as a cell phone, PDA, etc. and/or presence of metalized objects such as credit cards, smart cards, access cards, etc. The signal analyzer 124 can infer the gender and age of one or more persons based on returned MIR data. For example, male bodies can generally be characterized by higher mass density than female bodies, and thus can be characterized by somewhat greater reflectivity at a given range. Adult female bodies can exhibit relatively greater harmonic motion ("jiggle") responsive to movements, and can thus be correlated to harmonic spectra characteristics. Older persons generally move differently than younger persons, allowing an age inference based on detected movement in the region 110.

By determination of one or more such aspects and/or combinations of aspects, the signal analyzer 124 can determine a demographic of one or more persons 112 in the region 110.

For example, MIR data can include movement corresponding to the beating heart of one or more persons 112 in the region 110. The signal analyzer 124 can filter the MIR data to remove information not corresponding to a range of heart rates, and determine one or more heart rates by comparing movement of the heart surface to the MIR signal rate. The one or more heart rates can further be characterized according to a confidence factor, depending on statistical certainty regarding the determined one or more heart rates.

Similarly, the signal analyzer 124 can determine one or more respiration rates by measuring movement corresponding to the chest or diaphragm of one or more persons 112. The signal analyzer 124 can determine movement, a direction of movement, and/or a rate of movement of one or more persons 112 in the region 110. Operation of the signal analyzer 124 is described in greater detail below by reference to FIGS. 2 and 3.

An electronic controller 106 can be operatively coupled to the pulse generator 102, the transmitter 108, the range delay 116, the receiver 118, the analog-to-digital converter 122, the signal processor 120, and/or the signal analyzer 124 to control the operation of the components of the MIR 101. For embodiments so equipped, the electronic controller 106 can also be operatively coupled to the second receiver 118b, and the second analog-to-digital converter 122b. The data interface 126 can include a high speed interface configured to output data from the signal analyzer 124. Alternatively, for cases where signals are analyzed externally to the MIR, the data interface 126 can include a high speed interface configured to output MIR data from the signal processor 120. The data interface 126 can include an interface to the controller 106. Optionally, the controller 106 can be interfaced to external systems via a separate interface (not shown).

Figure 2:
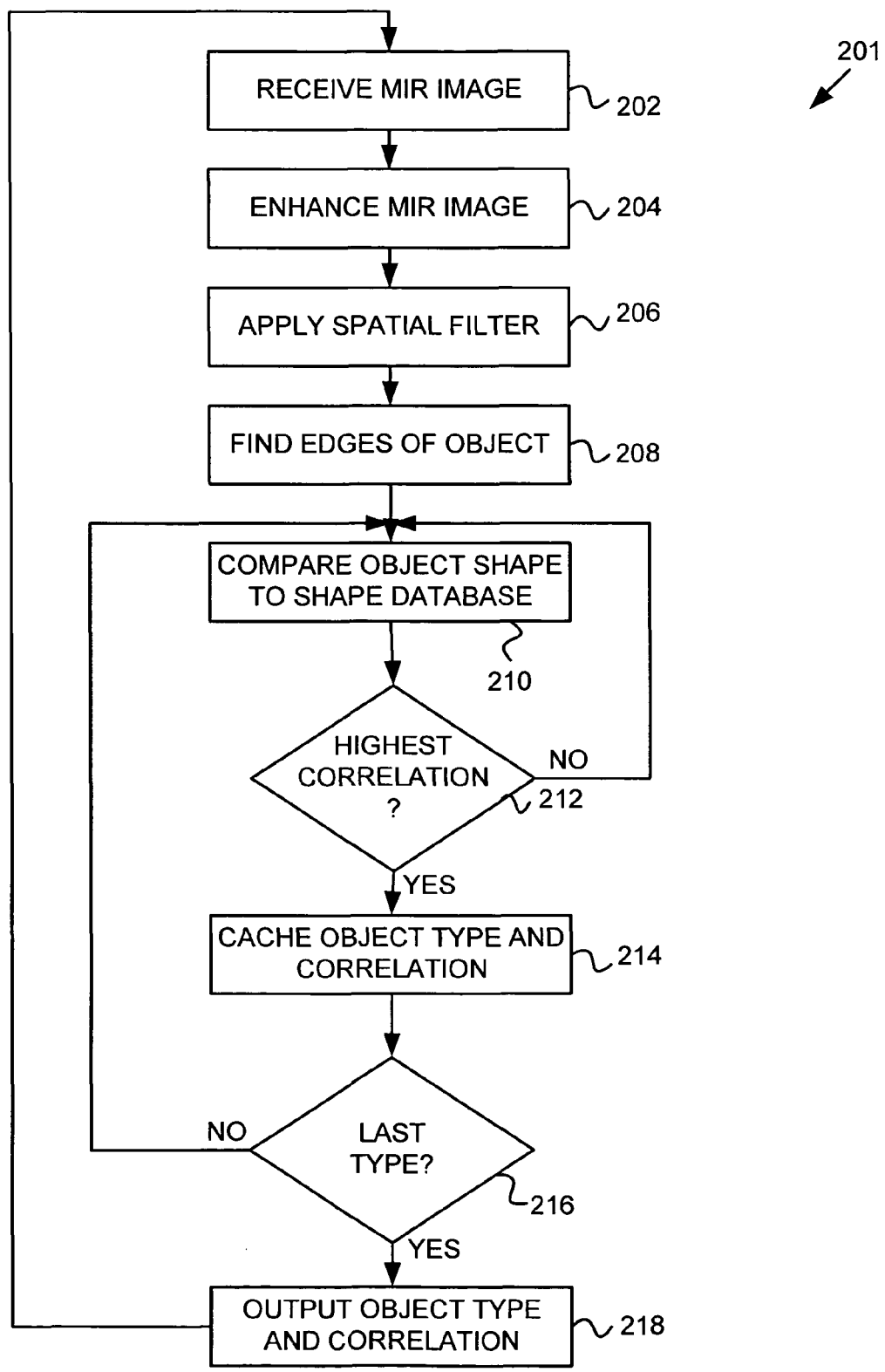
FIG. 2 is a flow chart showing an illustrative process for determining the presence of a person in a region with the MIR of FIG. 1, according to an embodiment.

FIG. 2 is a flow chart showing an illustrative process 201 for determining the presence of one or more persons 112 in the region 110 with the signal analyzer 124 of the MIR 101, according to an embodiment. Beginning with step 202, MIR data is received as described above in conjunction with FIG. 1. The MIR data can correspond to a plurality of probes of the region 110. Proceeding to optional step 204, the MIR data can be enhanced to facilitate processing. For example, grayscale data corresponding to static reflection strength as a function of triangulated position can be adjusted, compressed, quantized, and/or expanded to meet a desired average signal brightness and range. Additionally or alternatively, velocity information corresponding to Doppler shift, and/or frequency transform information corresponding to periodically varying velocity can similarly be adjusted, compressed, quantized, and/or expanded. Systematic, large scale variations in brightness can be balanced, such as to account for side-to-side variations in antenna coupling to the region. Contrast can be enhanced such as to amplify reflectance variations in the region.

Proceeding to optional step 206, a spatial filter can be applied. Application of a spatial filter can reduce processing time and/or capacity requirements for subsequent steps described below. The spatial filter may, for example, include a computed angle or computed extent filter configured to remove information corresponding to areas of contrast, velocity, or frequency component(s) having insufficient physical extent to be large enough to be an object of interest. The spatial filter may, for example, identify portions of the region 110 having sufficient physical extent to correspond to body parts or an entire body of a person 112, and remove features corresponding to smaller objects such as small animals, leaves of plants, or other clutter. According to an embodiment, the spatial filter can remove information corresponding to areas of contrast, velocity, or frequency component(s) having physical extent greater than a maximum angle or extent that is likely to correspond to a person or persons 112. In other embodiments, the spatial filter applied in step 206 can eliminate small, low contrast features, but retain small, high contrast features such as jewelry, since such body ornamentation can be useful in some subsequent processes. The step of applying the spatial filter 206 can further include removing background features from the MIR data. For example, a wall lying between an antenna 104, 114 and the region 110 can cast a shadow such as a line in every MIR signal. Removal of such constant features can reduce subsequent processing requirements.

Proceeding to optional step 208, an edge-finder can identify edges of objects 112 in the region 110. For example, a global threshold, local threshold, second derivative, or other algorithm can identify edge candidates. Object edges can be used, for example, to identify object shapes, and thus relieve subsequent processes from operating on grayscale data. Alternatively, step 208 can be omitted and the process of identifying objects can be performed on the grayscale MIR data.

Proceeding to step 210, processed data corresponding to the MIR data is compared to a database to determine a match. The object data received from step 202 (and optionally steps 204, 206, and/or 208) can be compared to corresponding data for known objects in a shape database. Step 210 can be performed on a grayscale signal, but for simplicity of description it will be assumed that optional step 208 was performed and matching is performed using object edges, velocity, and/or spectrum values. For example, the edge of an object 112 in the region 110 can include a line corresponding to the outline of the head and torso, cardiac spectrum, and movements characteristic of a young adult male. A first shape in the shape database can include the outline of the head and torso, cardiac spectrum, density, and movements characteristic of a young adult female and/or the head and torso outline, cardiac spectrum, density, and movements characteristic of a generic human. The differences between the MIR data and the shape database shape can be measured and characterized to derive a probability value. For example, a least-squares difference can be calculated.

Optionally, the object shape from the MIR data can be stepped across, magnified, and stepped up and down the shape database data to minimize a sum-of-squares difference between the MIR shape and the first shape in the shape database. The minimum difference corresponds to the probability value for the first shape.

Proceeding to step 212, if the probability value for the first shape is the best probability yet encountered, the process proceeds to step 214. For the first shape tested, the first probability value is the best probability yet encountered. If an earlier tested shape had a higher probability to the MIR data, the process loops back from step 212 to step 210 and the fit comparison is repeated for the next shape from the shape database.

In step 214, the object type for the compared shape from the shape database and the best probability value for the compared shape are temporarily stored for future comparison and/or output. For example, the compared shape from the shape database can be identified by metadata that is included in the database or embedded in the comparison data. Proceeding to step 216, the process either loops back to step 210 or proceeds to step 218, depending on whether a test is met. If the most recently compared shape is the last shape available for comparison, then the process proceeds to step 218. Optionally, if the most recently compared shape is the last shape that the process has time to compare (for example, if a new MIR data is received and/or if another process requires output data from the process 201) then the process proceeds to step 218. In step 218, the object type and the probability value is output. The process can then loop back to step 202 and the process 201 can be repeated.

Otherwise, the process 201 loops from step 216 back to step 210. Again, in step 210, the next comparison shape from a shape database is loaded. According to an embodiment, the comparison can proceed from the last tested shape in the shape database. In this way if the step 218 to 202 loop occurs more rapidly than all objects in the shape database can be compared, the process eventually works its way through the entire shape database. According to an embodiment, the shape database can include multiple copies of the same object at different orientations, distances, and positions within the region. This can be useful to reduce processing associated with stepping the MIR shape across the shape database shape and/or changing magnification.

The object type can include determination of a number of persons 112 in the region 110. For example, the shape database can include outlines, cardiac and/or respiration spectra, density, and movement characteristics for plural numbers of persons. According to embodiments, the shape library can include shapes not corresponding to persons. This can aid in identification of circumstances where no person 212 is in the region 210. Optionally, process 201 can be performed using plural video frames such as averaged video frames or a series of video frames. Optionally, steps 212, 214, and 216 can be replaced by a single decision step that compares the probability to a predetermined value and proceeds to step 218 if the probability meets the predetermined value. This can be useful, for example, in embodiments where simple presence or absence of a person 212 in the region 210 is sufficient information.

According to an embodiment, the signal analysis process 201 of FIG. 2 can be performed using conventional software running on a general-purpose microprocessor. Optionally, the process 201 can use various combinations of hardware, firmware, and software; and can include the use of a digital signal processor.

Figure 3:
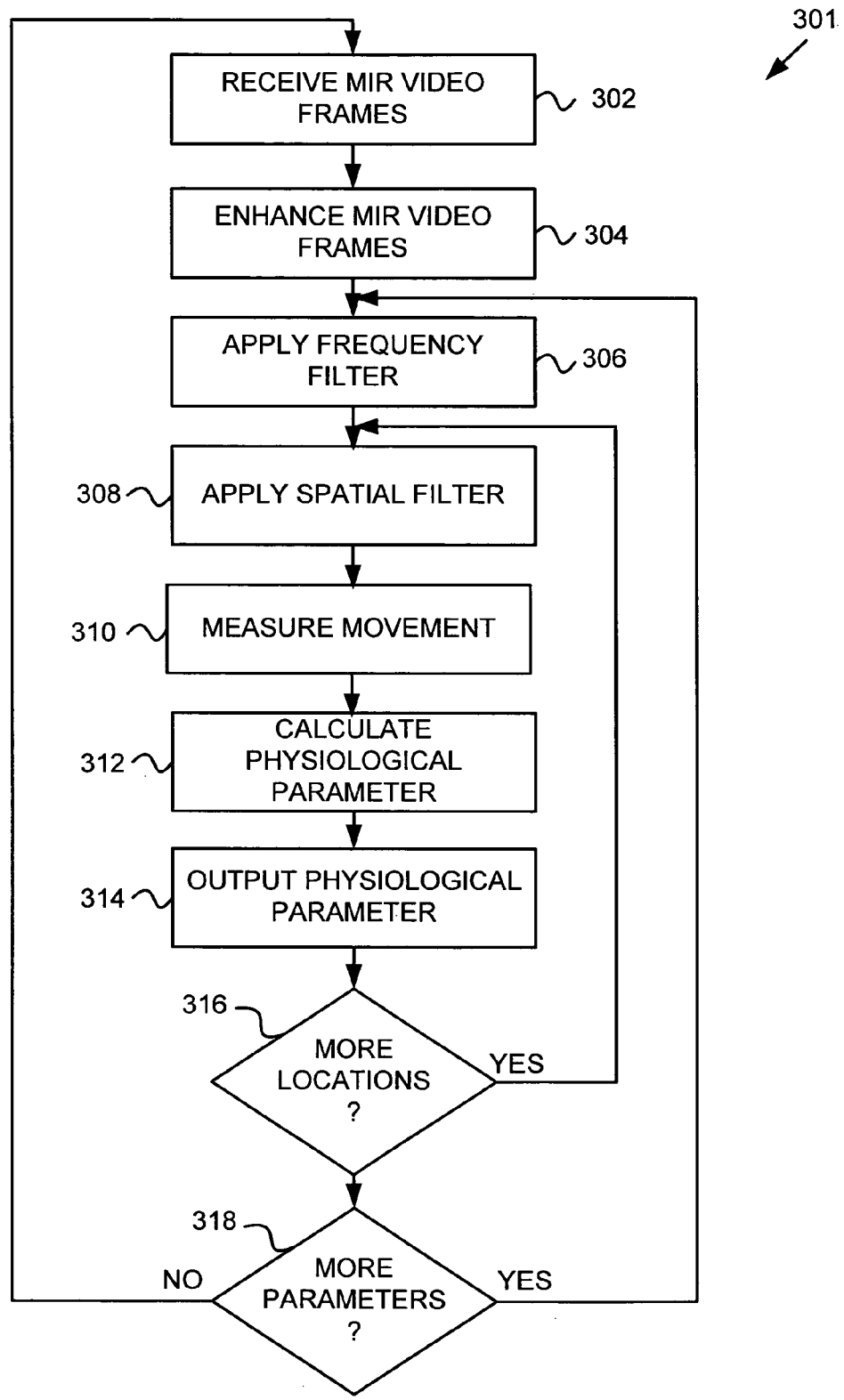
FIG. 3 is a flow chart showing an illustrative process for determining a physiological parameter of a person in a region with the MIR of FIG. 1, according to an embodiment.

FIG. 3 is a flow chart showing an illustrative process 301 for determining one or more particular physiological parameters of a person 112 in the region 110 with the signal analyzer 124 of the MIR 101, according to an embodiment. Optionally, the process 301 of FIG. 3 can be performed conditional to the results of another process such as the process 201 of FIG. 2. For example, if the process 201 determines that no person 112 is in the region 110, then it can be preferable to continue to repeat process 201 rather than execute process 301 in an attempt to extract one or more particular physiological parameters from a person that is not present.

Beginning with step 302, a series of MIR time series data is received. While the received time series data need not be purely sequential, the process 301 generally needs the time series data received in step 302 to have a temporal capture relationship appropriate for extracting time-based information. According to an embodiment, the MIR time series data can have a frame rate between about 16 frames per second and about 120 frames per second. Higher capture rate systems can benefit from depopulating frames, such as by dropping every other frame, to reduce data processing capacity requirements.

Proceeding to step 304, the MIR video frames can be enhanced in a manner akin to that described in conjunction with step 204 of FIG. 2. Optionally, step 304 can include averaging and/or smoothing across multiple MIR time series data. Proceeding to optional step 306, a frequency filter can be applied. The frequency filter can operate by comparing changes between MIR time series data to a reference frequency band for extracting a desired physical parameter. For example, if a desired physiological parameter is a heart rate, then it can be useful to apply a pass band for periodic movements having a frequency between about 20 cycles per minute and about 200 cycles per minute, since periodic motion beyond those limits is unlikely to be related to a human heart rate. Alternatively, step 304 can include a high pass filter that removes periodic motion below a predetermined limit, but retains higher frequency information that can be useful for determining atypical physiological parameters.

Proceeding to optional step 308, a spatial filter can be applied. The spatial filter may, for example, include a pass band filter configured to remove information corresponding to areas of contrast having insufficient physical extent to be large enough to be an object of interest, and remove information corresponding to areas too large to be an object of interest. The spatial filter may, for example, identify portions of the region 110 having sufficient physical extent to correspond to the heart, diaphragm, or chest of a person 112, and remove signal features corresponding to smaller or larger objects. The step of applying the spatial filter 308 can further include removing background features from the MIR data. For example, a wall lying between an antenna 104, 114 (114b) and the region 110 can cast a shadow such as a line in every instance of MIR data. Removal of such constant features can reduce subsequent processing requirements.

Proceeding to step 310, movement such as periodic movement in the MIR time series data is measured. For example, when a periodic motion is to be measured, a time-to-frequency domain transform can be performed on selected signal elements. For example, when a non-periodic motion such as translation or rotation is to be measured, a rate of movement of selected signal elements can be determined. Optionally, periodic and/or non-periodic motion can be measured in space vs. time. Arrhythmic movement features can be measured as spread in frequency domain bright points or can be determined as motion vs. time. Optionally, subsets of the selected signal elements can be analyzed for arrhythmic features. Optionally plural subsets of selected signal elements can be cross-correlated for periodic and/or arrhythmic features. Optionally, one or more motion phase relationships between plural subsets of selected signal features, between a subset of a selected signal feature and the signal feature, or between signal features can be determined.

For example, a person with a hiccup can be detected as a non-periodic or arrhythmic motion superimposed over periodic motion of a signal element corresponding to the diaphragm of the person.

Proceeding to step 312, a physiological parameter can be calculated. For example, MIR data can include data having a periodic motion spectrum corresponding to the location characteristic of a human physiological process (e.g. heartbeat and/or breathing). Step 312 can include determining one or more heart rates by comparing movement of the heart surface to the MIR signal rate. The one or more heart rates can further be characterized according to a confidence factor, depending on statistical certainty regarding the determined one or more heart rates. Similarly, step 312 can include determining one or more respiration rates by measuring movement corresponding to the chest or diaphragm of one or more persons.

Proceeding to step 314, the physiological parameter can be output. Proceeding to step 316, if there are more locations to measure, the process 301 can loop back to execute step 308. If there are not more locations to measure, the process can proceed to step 318. In step 318, if there are more physiological parameters to measure, the process 301 can loop back to execute step 306. If there are not more physiological parameters to measure, the process 301 can loop back to step 302, and the process 301 of FIG. 3 can be repeated.

Figure 4:
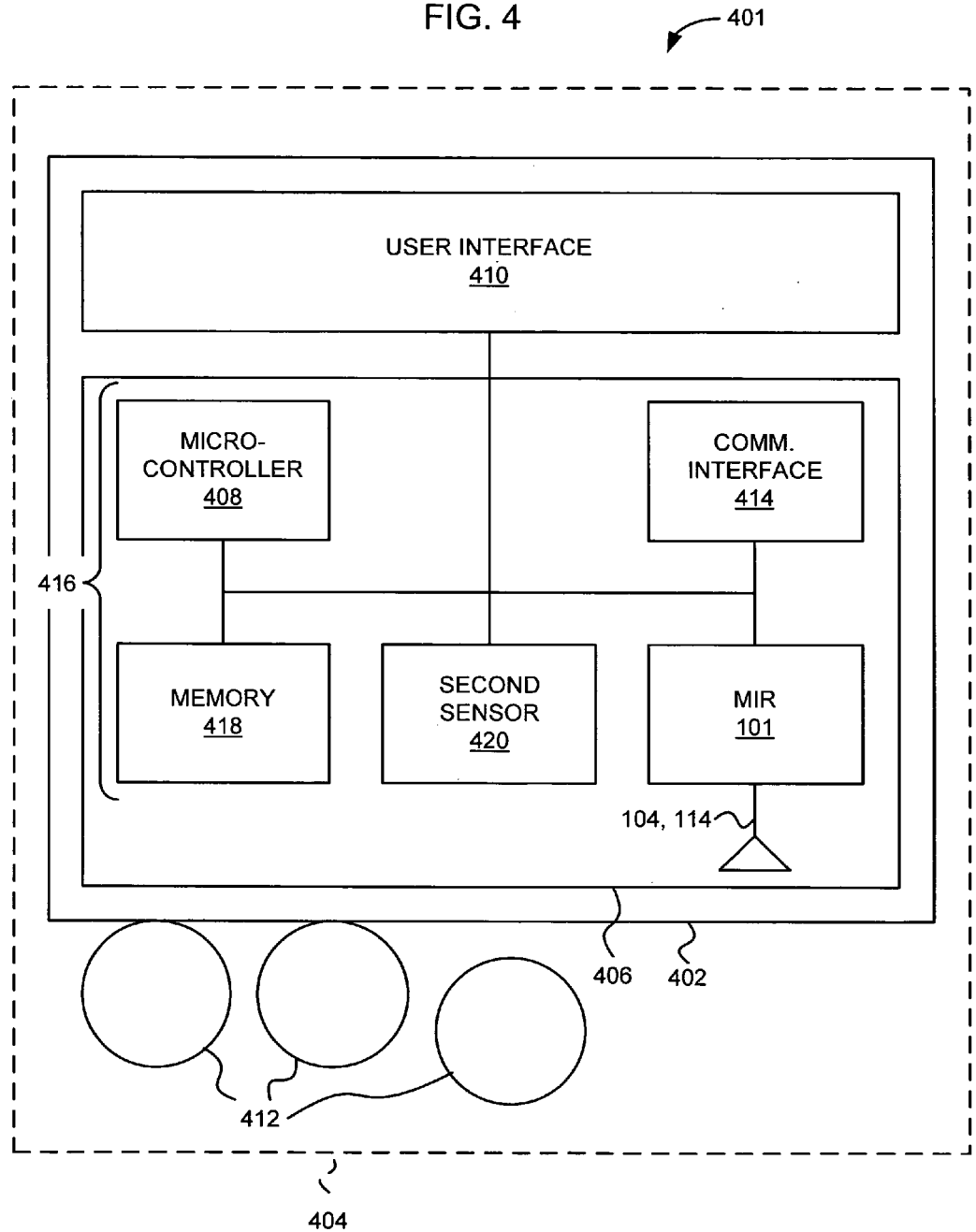
FIG. 4 is a block diagram of a personal electronic device including a MIR, according to an embodiment.

FIG. 4 is a block diagram of a personal electronic device 401 including a MIR 101, according to an embodiment. The personal electronic device 402 can be a cellular phone, a smart phone, a personal data assistant, a pager, or a tablet computer, a netbook, a notebook computer, or a combination thereof. for example. The device 401 can include a logic circuit 416 and at least one MIR 101 operatively coupled to the personal electronic device 402 and the logic circuit 416. The MIR 101 can be configured to probe one or more regions 404 near the personal electronic device 402 to produce MIR data. The MIR 101 can be operatively coupled to the personal electronic device 402 via an exposed interface. For example, the exposed interface can include a USB interface, a SIM card interface, a WiFi interface, a BlueTooth interface, a ZigBee interface, an infrared interface, or a proprietary interface.

Alternatively, at least a portion of the MIR 101 can be located inside the personal electronic device 402. The personal electronic device 402 can include at least one circuit board 406. At least a portion of the MIR 101 can be integrated with the circuit board(s) 406. The MIR 101 can include one or more antennas 104, 114 formed as electrical traces on the circuit board(s) 406. Optionally, the MIR 101 can include a pulse generator (see FIG. 1, 102) and a range delay (see FIG. 1, 116) embodied as operations of a microcontroller or microprocessor 408. Furthermore, the MIR 101 can include at least one receiver (see FIG. 1, 118) embodied as one or more capture-and-hold capacitors (not shown) on the circuit board(s) 406 operatively coupled to antenna(s) 104, 114. Alternatively, the capture-and-hold capacitor(s) can be integrated into the microcontroller or microprocessor 408. Optionally, the MIR 101 can also include a signal processor (see FIG. 1, 120) embodied as software or firmware running on the microcontroller or microprocessor 408.

Optionally, the MIR 101 can be configured in a bistatic architecture with at least one component of the MIR 101 being in the personal electronic device 402, and at least one other component of the MIR being located separately. Alternatively, the MIR 101 can be made according to a monostatic architecture, with substantially the entire MIR being in the personal electronic device 402.

Figure 5:
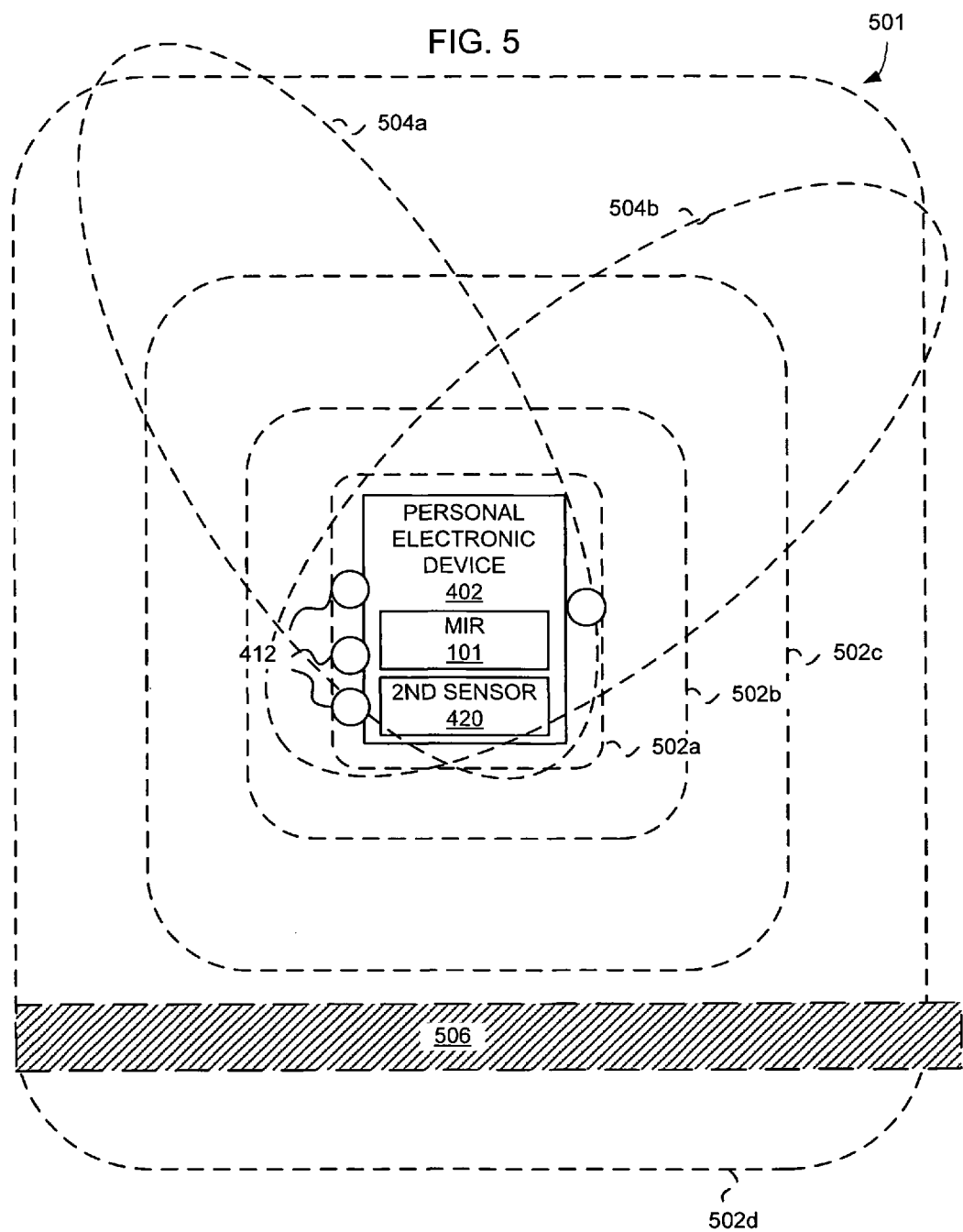
FIG. 5 is a diagram illustrating a plurality of regions and directions that can be probed by the MIR, according to an embodiment.

FIG. 5 is a diagram 501 illustrating a plurality of regions 502a, 502b, 502c, 502d and directions 504a, 504b that can be probed by the MIR, according to an embodiment. The one or more regions 502a, 502b, 502c, 502d near the personal electronic device 402 can correspond to one or more regions probed by the micro-impulse radar 101. A personal electronic device 402 can be operatively coupled to a MIR 101 configured to probe a plurality of regions 502a, 502b, 502c, 502d in the vicinity of the personal electronic device 402. As described above, the MIR 101 can be located inside the personal electronic device 402. The plurality of regions 502a, 502b, 502c, 502d can each be defined by a respective border. While the embodiment 501 shows two-dimensional projections of the regions 502a, 502b, 502c, 502d; the regions 502a, 502b, 502c, 502d may typically be three dimensional. The borders of the regions can be regular and symmetrical in their respective locations relative to the personal electronic device 402 and one another, or can be described by asymmetrical and/or irregular edges be symmetrically located away from the personal electronic device. The regions 502a, 502b, 502c, 502d may, as indicated, correspond to a series of subsets of one another, wherein region 502b includes all of 502a, region 502c includes all of regions 502a and 502b, and region 502d includes all of 502a, 502b, and 502c. Alternatively, some of the regions can exclude other regions nearer the personal electronic device 402.

The regions 502a, 502b, 502c, 502d can be selected by choosing one or more range delays during which reflections from probe pulses are received (see FIG. 1 and corresponding description) such that reflections returning from objects within a selected region are captured, but reflections from one or more other regions are not captured. Additionally or alternatively, the regions 502a, 502b, 502c, 502d can be selected by choosing a MIR 101 probe pulse power and/or a MIR probe pulse spectral content. MIR probe pulse spectral content can be selected by selecting from among a plurality of probe pulse output antennas, for example. Additionally or alternatively, the regions 502a, 502b, 502c, 502d can be selected by choosing a MIR 101 range delay. For example, a longer range delay can cause the MIR receiver to receive probe pulse responses from more distant regions 502c and/or 502d. A shorter range delay can cause the MIR receiver to receive probe pulse responses from nearer regions 502a and/or 502b.

The MIR 101 can be configured to probe one or more selected subsets of the one or more regions 502a, 502b, 502c, 502d and/or one or more selected directions 504a, 504b from the MIR 101. For example, the MIR 101 can use a probe antenna and/or receiving antenna selected to provide directional selectivity to detect objects within selected directions 504a, 504b relative to the personal electronic device 401. The one or more regions 502a, 502b, 502c, 502d near the personal electronic device correspond one or more regions not visible from the personal electronic device 402. For example, a wall 506, such as a briefcase wall, vehicle body, etc., can be positioned relative to the personal electronic device 402. A region 502d can include a region separated from the personal electronic device 402 by the wall 506. The portion of the region 502d separated from the personal electronic device 402 by the wall 506 can also be not visible to a user 112 of the personal electronic device.

One or more regions 502a, 502b, 502c, 502d near the personal electronic device 402 can correspond to one or more possible locations of a user 112 or a part 412 of the user 112 positioned to interact with the personal electronic device 402. One or more regions 502a can correspond to contact with or positioned to receive vibrations from the personal electronic device. For example, a person's fingers 412 or another part of a person's body can be positioned to be in contact with a housing of the personal electronic device 402. When an incoming call is received by the personal electronic device 402, the personal electronic device 402 can be configured to substitute or augment a ringtone with a vibration alert, for example.

Optionally, one or more regions 502b can correspond to the personal electronic device 402 being within reach of a user. The personal electronic device can optionally be configured to operate with an audible ringtone and with a requirement for the user to actuate a touch-type user interface to answer an incoming call when the user is within reach 502b of the personal electronic device 402.

Optionally, one or more regions 502c can correspond to the personal electronic device 402 being within hearing range of a user 112. When the probes from the region 502a and 502b are suppressed (for example, by selecting a suitable range delay and/or by subtracting one or more probe responses received from the regions 502a, 502b, a user 112 present in the subset of the region 502c not overlapping regions 502a, 502b can indicate that the personal electronic device 402 is not within reach of the user 112. In such a case, for example, the personal electronic device 402 can be configured to output an audible ringtone and not require the user to actuate a touch-type user interface to answer an incoming call. The personal electronic device 402 can further be configured to operate in a speakerphone mode and/or respond to voice dialing input from the user 112. Thus, at least one region 506, optionally minus regions 502a, 502b, can correspond to hands-free interaction with the personal electronic device 402 by the user 112.

Optionally, a logic circuit in the personal electronic device 402 and/or a remote logic circuit (not shown) can infer when a user is likely to be in a conference setting. Accordingly, at least one region 502c can correspond to a conference setting of the personal electronic device. This can be used, for example, to place the personal electronic device 402 in a speakerphone mode, or alternatively can be used to suppress incoming calls. For example, when a portion of the user is within a region 502a, more persons are detected within a region 502c, and the relative positions of the persons are substantially unchanging for a period, and the personal electronic device 402 is not activated as a speakerphone; the logic circuit can infer that the user is in a business conference and forward incoming calls rather than interrupt the conference setting.

Returning to FIG. 4, the personal electronic device 402 can include a user interface 410 operatively coupled to the logic circuit 416. The user interface 410 can include a display, or alternatively, one or more of a haptic or audio output device. The personal electronic device 402 can output user perceptible data on the user interface 410 corresponding to MIR data from the MIR 101. The personal electronic device 402 can be configured to output the user perceptible data as a minimally-processed representation of MIR data from the MIR 101 or as a processed representation of MIR data from the MIR 101. For example, the user perceptible data can include a display indicating the location of objects 412 imaged by the MIR 101 in association with a map. Optionally, the personal electronic device 402 can output a representation of one or more operating parameters selected or changed responsive to MIR data from the MIR 101.

The logic circuit 416 can be configured to analyze the MIR data, and can be configured to select one or more operating parameters of the portable electronic device 402 responsive to the MIR data. For example, the logic circuit 416 can be configured to compare the MIR data to one or more criteria, and output data or select operating parameters responsive to the comparison. Such one or more criteria can include range, strength-of-response, direction, spectral characteristics, polarization, and/or Doppler characteristics, for example.

As described above, the logic circuit 416 can be configured to determine from the MIR data when a user 112 is positioned to interact with the personal electronic device 402. For example, the logic circuit 416 can be configured to select a vibrate alert when the user 112, 412 is in contact with the personal electronic device 402. Similarly, the logic circuit 416 can be configured to select a tone alert when the user 112 is near (e.g., within regions 502b and/or 502c) but not in contact with (e.g., not within the region 502a) the personal electronic device 402.

The personal electronic device 402 can include a communication interface 414 operatively coupled to the logic circuit. For example, the communication interface 414 can include a wireless telephone and/or data network interface, a Wi-Fi interface, a WiMAX interface, or other interface that can send and/or receive calls, messages, and/or data from other network-connected devices. The logic circuit 416 can be configured to suspend alerts for incoming messages across the communication interface 414 when the personal electronic device 402 is in a conference setting. The logic circuit 416 configured to determine when a user 112 is not positioned to interact with the personal electronic device 402, and can be configured suspend alerts when the user 112 is not positioned to interact with the personal electronic device 402. For example, the logic circuit 416 can be configured to process incoming data according to no-answer conditions (e.g., forward to voicemail) when the user 112 is not positioned to interact with the personal electronic device 402.

Optionally, the personal electronic device 402 can include a network communication interface 414 operatively coupled to the logic circuit 416 and configured to output MIR data to a network resource (not shown). The network communication interface 414 can be configured to receive data determined responsive to MIR data from the MIR 101 from the network resource (not shown). The personal electronic device 402 can be configured to transmit MIR data from the MIR to the remote resource, and receive from the remote resource one or more personal electronic device 402 operating parameters.

The personal electronic device 402 can include logic circuitry 416 operatively coupled to the MIR 101 and configured to analyze MIR data from the MIR 101. The logic circuit 416 can include the microcontroller or microprocessor 408, memory 418, and/or other related components. The MIR data can include information indicative of an identity characteristic of at least one person 112 in one or more regions 502a, 502b, 502c, 502d. The identity characteristic can include a personal identity and/or an anonymous identity. For example, the at least one person 112 can include an owner or user of the personal electronic device. The personal electronic device 402 can be configured to select one or more operating parameters responsive to the presence or absence of one or more living persons 112 in proximity to the personal electronic device 402. According to an embodiment, the personal electronic device 402 can be configured to operate in a selected way when the owner 112 is present, and operate in a different way (or not operate at all), when the owner 112 is not present.

The way in which the personal electronic device (or alternatively, a network resource operatively coupled to the personal electronic device) can determine or infer an identity is described below.

The MIR 101 is configured to capture signals from a region 110. The logic circuit 416 can be configured to perform signal processing on signals received from the MIR 101. The logic circuit can then extract from the signals information corresponding to at least one attribute corresponding to a person 112, 412. The at least one attribute can include a plurality of attributes corresponding to a human form 112, 412. The plurality of attributes can include at least one physical attribute and/or at least one physiological attribute corresponding to the person 112. The logic circuit 416 is configured to receive the information corresponding to the at least one physical attribute and/or the at least one physiological attribute, and determine a phenotypic identity corresponding to the at least one physical attribute and/or the at least one physiological attribute. An electronic memory or computer storage device 418 is configured to receive and hold the information corresponding to the attribute(s) and the determined phenotypic identity. For example, determining a phenotypic identity can include storing data corresponding to the information in a memory, a look-up table, and/or a database. The control circuit 416 can include an electronic memory and/or computer storage device 418 configured to hold a tangible computer readable medium carrying a correlation between the phenotypic identity, at least one physical attribute and at least one physiological attribute.

Referring to FIG. 1, the MIR 101 can include a transmitter 108 configured to transmit electromagnetic pulses toward the region 110, a range delay gate 116 configured to delay the pulses, and a receiver 118 synchronized to the range delay gate 116 and configured to receive electromagnetic energy scattered from the pulses and output signals, which can be analog signals. The signals may, for example, include one or more of received radiation samples, raw detector signals, analog signals, digital signals or filtered signals. An analog-to-digital converter 122 can be operatively coupled to the receiver 118 and configured to convert analog signals from the receiver 118 into digital signals.

Referring again to FIG. 4, the control circuit 416 can extract at least one attribute of one or more persons 112, 41, and the control circuit 416 can save the attribute(s) as data in the memory or storage device 418. The control circuit 416 can then determine a phenotypic identity using a process including comparing the at least one attribute to one or more phenotypic identities in the memory or storage device 418. For example, the phenotypic identities can include attributes corresponding to one or more persons 112, 412 represented by previously received MIR 101 signals.

Optionally, the controller can be configured to determine the phenotypic identity by performing a joint fit or joint probability approach to matching attributes from two or more individuals to a plurality of phenotypic identities. In some circumstances, such a joint fit can give a faster, more certain, or otherwise better answer than a series of one-at-a-time fits.

Alternatively or additionally, the control circuit 416 can be further configured, if a best match between the attribute(s) and one or more phenotypic identities fails to meet one or more criteria, to store a new phenotypic identity by writing new phenotypic data corresponding to the attribute(s) to the memory or storage device 418.

According to an embodiment, the control circuit 416 can be operatively coupled via the communication interface 414 to a database server (not shown). Each of the one or more phenotypic identities can be provided as at least one database record including cells carrying data including one or more attribute descriptions, one or more attribute values, one or more attribute ranges, one or more attribute averages, one or more attribute weighted averages, one or more attribute probabilities, and/or one or more functions of previously observed values of an attribute. The control circuit 416 can be configured to submit a query to the database server (not shown) including one or more arguments corresponding to the at least one attribute extracted from the MIR signal. Determining a phenotypic identity can include reading records returned responsive to the database query.

According to embodiments, the phenotypic identities can include data corresponding to frequency domain data and spatial domain data extracted from the signals from the MIR 101. Additionally or alternatively, the phenotypic data can include personal attributes previously entered by the person 112, 412.

The electronic memory or computer storage device 418 can be further configured to hold individual identities corresponding to the phenotypic identities. The control circuit 416 can be further configured to match the phenotypic identity to the individual identity of the person 112, 412. For example, the control circuit 416 can be configured to match the phenotypic identity to the individual identity of a person 112, 412 by selecting the individual identity having the highest probability of matching the phenotypic identity out of a plurality of individual identities. Optionally, the controller can be configured to determine the individual identity by performing a joint fit or joint probability approach to matching phenotypic identities from two or more individuals to a plurality of individual identities.

The electronic memory or computer storage device 418 can be further configured to hold one or more preferences corresponding to the phenotypic identity (e.g., the user or owner of the personal electronic device 402). The control circuit 416 can be further configured to determine the one or more preferences corresponding to the phenotypic identity or individual identity corresponding to the phenotypic identity.

Examples of physical attributes that can be used to determine a phenotypic identity include a size of a person, a shape of a person, density of a person, detectable ornamentation associated with a person, equipment accompanying the person, equipment supporting the person, detectable clothing worn by a person, a heart size, a posture, a head-to-body size ratio, body movements, an in utero fetus, a prosthesis, and/or a personal appliance. Examples of physiological attributes that can be used to determine a phenotypic identity include a heart rate, a heart arrhythmia, a respiration rate, a respiration irregularity, a diaphragm motion, a diaphragm spasm, and/or a detectable health. Examples of equipment accompanying the person can include, for example, equipment that is carried, pushed or pulled by the person. For example, a hand truck, delivery cart, medical therapy apparatus, pharmacy cart, oxygen tank, etc. can tend to indicate a function or a physical requirement of a person, and thereby help identify the person. Examples of equipment supporting the person can include a personal conveyance such as a scooter, bicycle, motorcycle, a wheelchair, or other apparatus that may tend to be physically associated with a given person.

For example, a phenotypic identity can include structured data corresponding to "gender: male, carrying: cell phone, glasses, heart rate: 60-65 , height: 6'-2"; or "gender: female, carrying: computer, fetus $2^{nd}$ trimester, heart rate: 55-60 , height: 5'-6"." The phenotypic identity can then be compared to corresponding attributes of the user or owner of the personal electronic device, and the control circuit 416 can select operating parameters as a function of the presence of the user or owner, responsive to the location of the user or owner relative to the personal electronic device, and responsive to the environment in which the user or owner and the personal electronic device are situated.

As indicated above, the logic circuit 416 can include a look-up table, database, or algorithm selected to correlate data corresponding to the information indicative of the identity characteristic to the identity characteristic. The logic circuit 416 can be configured to correlate the data corresponding to the information indicative of the identity characteristic to the identity characteristic by accessing the look-up table, database, or algorithm.

The logic circuit 416 can be configured to select one or more operating parameters responsive to the identity characteristic. For example, the logic circuit 416 can be configured to select for the personal electronic device 402 one or more operating parameters including a message alert, a ringtone, a graphical user interface environment, an audio volume level, a microphone sensitivity level, on or off status of a video display, a magnification level of a video display, an unlock parameter, a lock parameter, a call forwarding parameter, a list access, an application access, a file access, or a combination thereof. As described above, the personal electronic device 402 can include a communication interface 414 operatively coupled to the logic circuit 416. The logic circuit 416 can be optionally configured to output the MIR data or second data corresponding to the MIR data to a remote resource (not shown) via the communication interface 414 and receive one or more operating parameters responsive to the identity characteristic from the remote resource via the communication interface 414.

As indicated above, the information indicative of an identity characteristic can include body size, body mass, height, body shape, posture, body permittivity, carried articles, detectable body ornamentation, a characteristic movement, a heart rate, an intracyclic heartbeat characteristic, breathing rate, a rate or magnitude of inhalation, a rate or magnitude of exhalation, a tremor of all or part of a body, an intracyclic breathing characteristic, an intercyclic breathing characteristic, a function thereof, or a function of two or more thereof.

The logic circuit 416 can be configured to compare the information indicative of an identity characteristic to previous information associated with the identity characteristic. The MIR data can include information related to a motion of one or more objects in the one or more regions 512a, 512b, 512c, 512d and information related to one or more physiological parameters of one or more persons 112, 412 in the one or more regions 512a, 512b, 512c, 512d. The MIR data can include spectral information corresponding to the one or more regions 512a, 512b, 512c, 512d.

Optionally, the personal electronic device 402 can include one or more second sensors 420 operatively coupled to the logic circuit 416. The logic circuit 416 can be configured to select one or more operating parameters for the personal electronic device 402 responsive to data or signals from the one or more second sensors 420 and responsive to the MIR data from the MIR 101.

The second sensor(s) 420 can include one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, a microwave sensor, and/or a vibration sensor, for example. The logic circuitry 416 can be configured to select one or more operating parameters for the personal electronic device 402 responsive to data or signals from the one or more second sensors 420 and/or data from the MIR 101.

The logic circuit 416 can also be operatively coupled to the user interface 410. The user interface 410 can receive user commands corresponding to one or more interactions between the MIR 110 and the logic circuit 416. The interaction(s) can include a manual MIR 101 probe or automatic interaction(s). For example, automatic interaction(s) can include one or more of a schedule of probes, coupling to a computer program-driven control, and/or coupling to received external commands. Commands received through the user interface 410 can include selection of a MIR probe direction (see FIG. 5 504a, 504b, for example) or selection of sensitivity to a subset of probe regions 502a, 502b, 502c, 502d size of the probe regions, exclusionary relationships between the probe regions, etc. The logic circuit 416 can also receive user preferences via the user interface 410. The user preferences can be used to determine how an which personal electronic device 402 operating parameters are changed responsive to detection of the user, a non-user, proximity to the user, and/or the environment of the user, as described above.

Optionally, the logic circuitry 416 can be configured to output data via the user interface 410 responsive to data or signals from the second sensor(s) 420 and/or responsive to data from the MIR 101.

Figure 6:
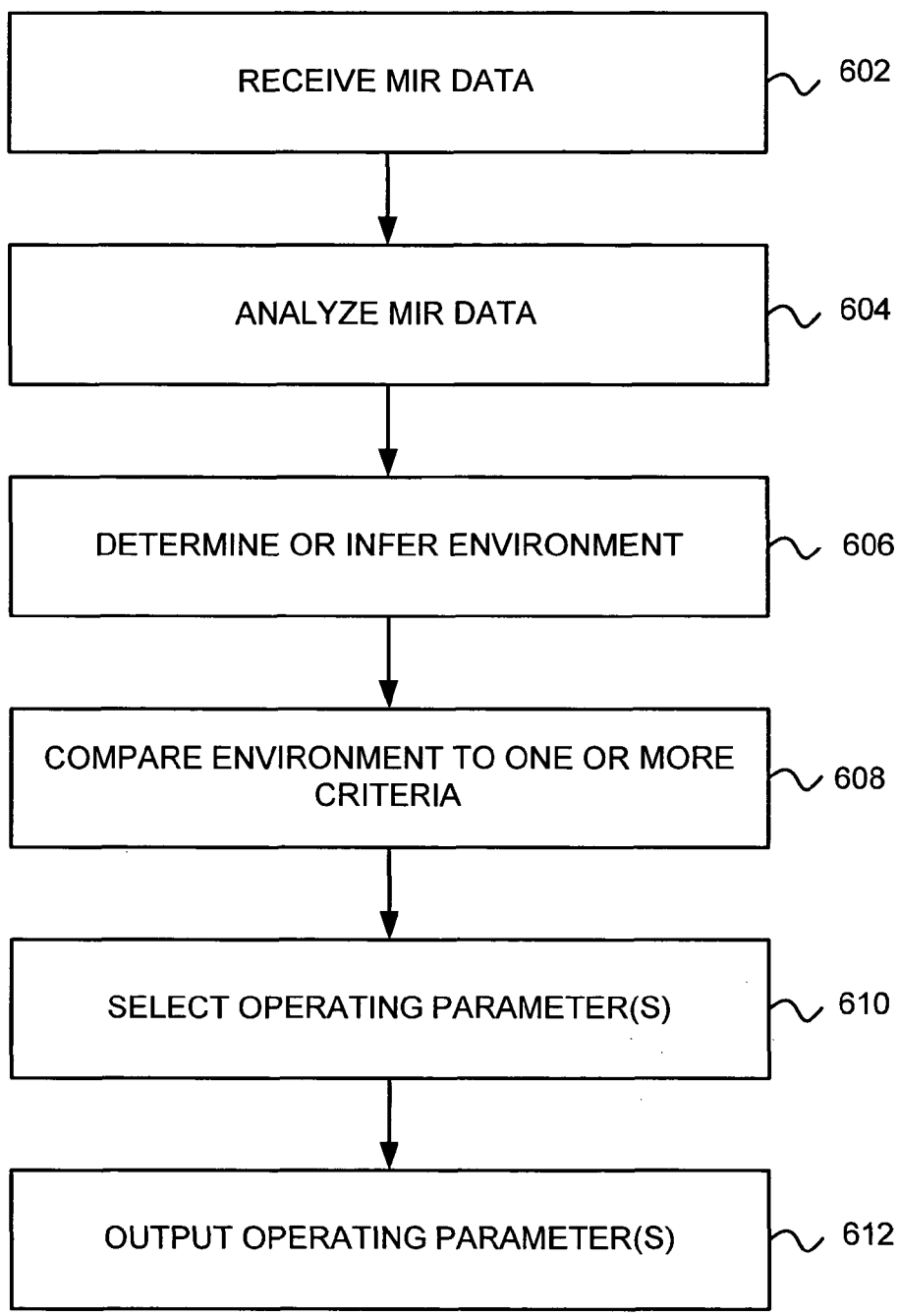
FIG. 6 is a flow chart showing an illustrative process for selecting operating parameters for a personal electronic device responsive to probing one or more regions with a MIR, according to an embodiment.

FIG. 6 is a flow chart showing a method 601 for performing one or more logic functions to provide at least one operating parameter for a personal electronic device (e.g., for a personal electronic device 402 shown in FIG. 4) responsive to MIR data, according to an embodiment. The method 601 can include step 602, wherein a MIR 101 operatively coupled to a personal electronic device 402 and the logic circuit 416 is operated to produce MIR data. Operating the MIR in step 602 can include outputting probe pulses to one or more regions (see FIG. 5, 502a, 502b, 502c, 502d) located peripheral to the personal electronic device. Next, the probe pulses, backscatter from the probe pulses, and/or radiation corresponding to the probe pulses and altered by objects in the one or more regions is/are received. The received probe pulses are detected at times synchronized to the output of the probe pulses, as described above in conjunction with FIG. 1. Step 602 can also include performing signal processing on the received and detected probe pulses to extract MIR data.

Optionally, for example, for embodiments where the MIR is not physically integrated into the personal electronic device, the method 601 can include transmitting the MIR data to the personal electronic device via an exposed interface (step not shown). Alternatively, as described in conjunction with FIG. 4, all or portions of the MIR can be integrated into the personal electronic device, and the personal electronic device can generate the MIR data from received probe pulses. The MIR can be made according to a monostatic or a bistatic architecture, as described above.

With reference to FIG. 5, operating the MIR can includes probing one or more selected subsets of the one or more regions 502a, 502b, 502c, 502c. Alternatively or additionally, operating the MIR can include probing one or more of a plurality of selected directions 504a, 504b from the MIR 101. The one or more regions 502a, 502b, 502c, 502c located peripheral to the personal electronic device 402 can correspond one or more possible locations of a user 112 or a part of the user 412 positioned to interact with the personal electronic device 402. For example, at least one region 502a can correspond to contact with or positioned to receive vibrations from the personal electronic device 402. One or more other regions 502b, 502c (or 502c minus 502b) can correspond to hands-free interaction with the personal electronic device 402. At least one region 502c, 502d can correspond to a conference setting of the personal electronic device 402.

Referring again to FIG. 6, after operating the MIR in step 602, the process 601 can proceed to step 604, wherein the MIR data is analyzed to extract one or more parameters. The one or more parameters can include information indicative of an environment of the personal electronic device and/or the user of the personal electronic device. As described above, the one or more parameters can also correspond to proximity of the user to the personal electronic device.

Step 604 can include analyzing the MIR data to extract information related to one or more of range, strength-of-response, direction, spectral characteristics, polarization, or Doppler characteristics. Examples of the information corresponding to the logic function(s) can include one or more of body size, body mass, height, body shape, posture, body permittivity, carried articles, detectable body ornamentation, a characteristic movement, a heart rate, an intracyclic heartbeat characteristic, breathing rate, a rate or magnitude of inhalation, a rate or magnitude of exhalation, a tremor of all or part of a body, an intracyclic breathing characteristic, a location of a user relative to the personal electronic device, a location of a plurality of persons relative to the personal electronic device, a position of the user relative to one or more regions peripheral to the personal electronic device, a position of a plurality of persons relative to one or more regions, a speed of the personal electronic device, a location of a motor vehicle operating position relative to the personal electronic device, and/or a location of the motor vehicle operating position relative to the user.

Optionally, the method 601 can include receiving user input (not shown) via a user interface of the personal electronic device. Receiving user input can include a command to operate the MIR and/or selection of one or more operating modes or parameters. The selection(s) can include parameter(s) for the MIR, specification of one or more (logical) responses of the personal electronic device to MIR data, or one or more automatic interactions with the MIR. For example, automatic interaction(s) can include one or more of a schedule of probes, coupling to a computer program-driven control, or coupling to received external commands. MIR parameters can include selection of a MIR probe direction or a subset of the one or more regions. MIR parameters, operating modes, or automatic interactions can optionally include interactions with the one or more second sensors.

Optionally, the method 601 can include outputting data or information corresponding to the MIR data (not shown) to a user via a user interface. For example, the user interface can include a display, a haptic output device, and/or an audio output device. For example, data or information output to the user can include a minimally-processed representation of MIR data, a processed representation of MIR data, and/or operating parameter(s) changed responsive to the MIR data.

Proceeding to step 606, an environment of the personal electronic device and/or the user of the personal electronic device is determined. As described above, the environment can include proximity of objects, types of objects, proximity of the user, identity of the user, proximity of other persons, and/or an inference of user activities such as participation in a conference.

Proceeding to step 608, the environment determined in step 606 can be compared to one or more criteria. Step 608 can also include determining whether to output data or select operating parameters responsive to the comparison between the inferred environment and the one or more criteria. For example, if the environment had not changed since a previous execution of the process 601, the process can loop back to step 602 or can enter a standby state. In other cases, the one or more criteria may not indicate any change in operation of the portable electronic device, and the process 601 can also loop back to step 602 or enter a standby state if no change is indicated. If, in step 608, the detected or inferred environment corresponds to a change in one or more operating parameters, the process 601 can proceed to step 610, wherein one or more operating parameters are selected.

Proceeding to step 610, performing one or more logic functions responsive to the MIR data can include selecting the at least one operating parameter for the portable electronic device responsive to the MIR data. For example, the MIR data can include information about when a user is positioned to interact with the personal electronic device. For example, step 610 can include selecting a vibrate alert when the user is in contact with the personal electronic device. Alternatively, step 610 can include selecting a tone alert when the user is near but not in contact with the personal electronic device. Alternatively, step 610 can include suspending alerts for incoming messages across a communication interface when the personal electronic device is in a conference setting.

In some cases, the MIR data can include information about when a user is not positioned to interact with the personal electronic device. In such a case, step 608 can include selecting an operating parameter to suspend alerts and process incoming data across a communication interface according to no-answer conditions when the user is not positioned to interact with the personal electronic device.

Proceeding to step 612, the operating parameters may be output. For example, this can include writing one or more data values to an internal memory. The data may be used, for example, to determine a ringtone, ring volume, call forward state, etc.

Optionally, some or all of the MIR data analysis in step 604, inferring or determining an environment in step 606, comparing the environment to one or more criteria in step 608, and selecting one or more operating parameters in step 610 can be performed as a process 624 by a remote resource. Accordingly, step 612 can include transmitting the operating parameter(s) to the personal electronic device via a data interface.

Figure 7:
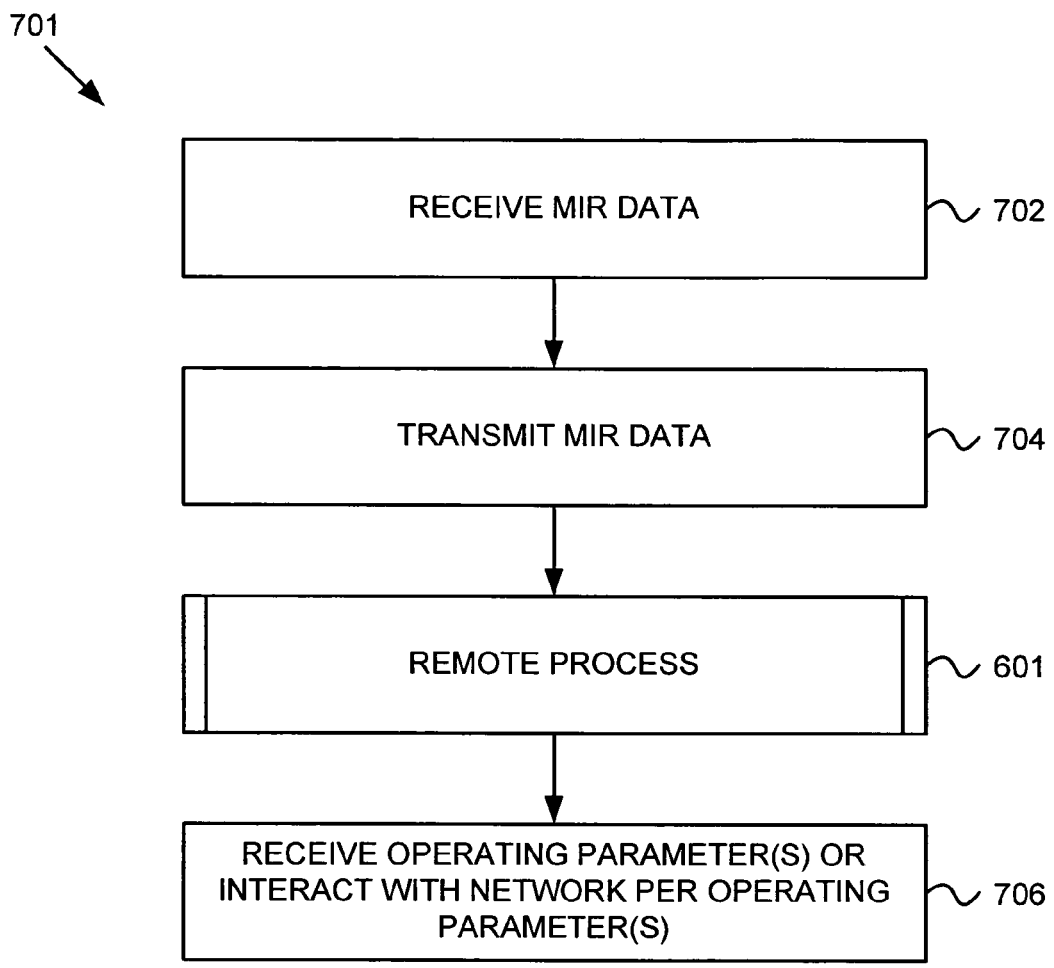
FIG. 7 is a flow chart showing an illustrative process for receiving operating parameters for a personal electronic device from a remote resource responsive to probing one or more regions with a MIR, according to an embodiment.

FIG. 7 is a flow chart showing a method 701 for selecting one or more operating parameters for a personal electronic device using a remote resource to process MIR data, according to an embodiment. Beginning with step 702, MIR data is received by the personal electronic device as described above. Optionally, the method 701 can include a step (not shown) wherein the MIR data is transformed to second data corresponding to the MIR data. For example, the second data may include data about frequency domain or spatial domain objects that can be used as criteria for comparison to infer or determine an environment of the personal electronic device and/or the environment or identity of a user of the personal electronic device.

Proceeding to step 704, the MIR data (or second data corresponding to the MIR data) is transmitted to a remote resource. Process 601 is not necessarily performed by the personal electronic device, but is included in the flow chart of FIG. 7 for clarity. Proceeding to step 706, one or more operating parameters can be received from the remote resource. Alternatively, the personal electronic device can be made to interact with a communication network according to the operating parameters. For example, step 704 can include receiving notification that the network will forward incoming calls to voicemail, and the actual carrying out of the process may be performed remotely.

The MIR data received in step 702 can include information indicative of an identity characteristic of at least one person in one or more regions. The identity characteristic can include a personal identity or an anonymous identity. The at least one person can include an owner or user of the personal electronic device. Accordingly, at least conditionally performing one or more logic functions (including selecting one or more operating parameters) responsive to the MIR data can include providing one or more operating parameters responsive to the identity characteristic.

Providing one or more operating parameters responsive to an identity characteristic can include correlating the data corresponding to the information indicative of the identity characteristic to the identity characteristic by accessing a look-up table, database, or algorithm. The information indicative of an identity characteristic can include body size, body mass, height, body shape, posture, body permittivity, carried articles, detectable body ornamentation, a characteristic movement, a heart rate, an intracyclic heartbeat characteristic, breathing rate, a rate or magnitude of inhalation, a rate or magnitude of exhalation, a tremor of all or part of a body, an intracyclic breathing characteristic, or an intercyclic breathing characteristic, a function thereof, or a function of two or more thereof.

When comparing an environment to a criterion or criteria includes comparing information indicative of an identity characteristic, it can include comparing the information indicative of an identity characteristic to previous information associated with the identity characteristic.

Referring again to FIG. 6, the method 601 can also include operating one or more second sensors to receive second sensor data or signals (not shown). Selecting one or more operating parameters in step 610 can include selecting the parameter(s) responsive to the MIR data and the second sensor data. Optionally, in some embodiments, step 610 can be performed responsive to second sensor data and not responsive to MIR data. Similarly, outputting data via a user interface in step 622 can be performed responsive to the second sensor data or signals, alone or in combination with the MIR data.

Optionally, operating the MIR in step 602 can be performed responsive to the second sensor data or signal, and/or operating the second sensor can be performed responsive to the MIR data. The one or more second sensors can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a millimeter wave sensor, and/or a vibration sensor, for example.

Optionally, some or all of the methods 601 and/or 701 shown in FIGS. 6 and 7 can be embodied as computer readable instructions carried by non-transient computer readable media. Thus, the computer readable instructions can cause one or more computers to perform the steps.

FIG. 8 is a block diagram of a system 801 including a network resource 802 configured to be operatively coupled to one or more personal electronic devices 402 including MIRs 101, according to an embodiment. The network resource 802 can be configured to receive MIR data from one or more personal electronic devices 402. A communications circuit 804 can be configured to operatively couple the one or more personal electronic devices 402 to the network resource 802. Each personal electronic device 402 can be operatively coupled to at least one MIR 101, and each personal electronic device 402 can be configured to transmit MIR data from the MIR 101 to the network resource 802. The network resource 502 can include a logic circuit 806 configured to perform one or more logical operations to produce at least one parameter that is a function of the MIR data. The logic circuit 806 can be further configured to analyze the MIR data from the one or more personal electronic devices.

The personal electronic devices 402 can include one or more of cellular phones, smart phones, tablet computers, pagers, netbooks, notebook computers, or a combination thereof, for example. In some embodiments, at least a portion of the MIRs 101 can operatively coupled to at least a portion of the personal electronic devices 402 via exposed interfaces (not shown). Such exposed interfaces can include USB interfaces, SIM card interfaces, Wi-Fi interfaces, BlueTooth interfaces, ZigBee interfaces, infrared interfaces, and/or proprietary interfaces, for example.

Alternatively, at least a portion of the MIRs 101 can be located inside at least a portion of the personal electronic devices 402. At least a portion of the one or more personal electronic devices 402 include at least one component of a monostatic MIR 101. Alternatively or additionally, at least a portion of the one or more personal electronic devices 402 can include at least one component of a bistatic MIR 101.

According to some embodiments, the entire MIR 101 can be located inside at least a portion of the personal electronic devices 402, as depicted diagrammatically in FIG. 4.

As indicated above, the network resource 802 can include logic circuitry 806 configured to analyze the MIR data from the one or more personal electronic devices 402. The logic circuitry 806 can be configured to perform one or more logical operations to produce at least one parameter that is a function of the MIR data. The parameter(s) can include at least one personal electronic device 402 parameter. Accordingly, the logic circuitry 806 can be configured to select one or more operating parameters of each portable electronic device 402 responsive to the MIR data. The network resource 802 can accordingly be further configured to transmit the one or more operating parameters to each portable electronic device 402 via the communications circuit 804.

The logic circuitry 806 can be configured to compare the MIR data to one or more criteria, and output data or select operating parameters responsive to the comparison. The one or more criteria can include range, strength-of-response, direction, spectral characteristics, polarization, and/or Doppler characteristics, for example. The logic circuitry 806 can be configured to determine or infer, from the MIR data, an environment 110, 502a, 502b, 502c, 502d of the personal electronic device 402.

For example, the logic circuit 806 can be configured to determine from the MIR data when a user 112, 412 is positioned to interact with the personal electronic device 402. For example, the parameter can be selected to cause the personal electronic device 402 to select a vibrate alert when the user 112, 412 is in contact with the personal electronic device 402. Alternatively, the parameter can be selected to cause the personal electronic device 402 to select a tone alert when the user 112, 412 is near but not in contact with the personal electronic device 402. Optionally, the parameter can be selected to cause the personal electronic device 402 to suspend alerts for messages sent to the personal electronic device 402 when the personal electronic device is in a conference setting. The logic circuit 806 can be configured to determine when a user is not positioned to interact with the personal electronic device. For example, the logic circuit 806 can be configured to select a parameter configured to cause the personal electronic device 402 to suspend alerts and process incoming data according to no-answer conditions when the user 112, 412 is not positioned to interact with the personal electronic device 402.

Optionally, at least a portion of the one or more personal electronic devices 402 can include one or more second sensors 420 operatively coupled to the personal electronic device 402. The network resource 802 can be configured to receive data or signals from the one or more second sensors 420. The logic circuitry 806 can be configured to select at least one parameter responsive to the data or signals from the one or more second sensors 420 and data from the MIR 101. For example, the one or more second sensors 420 can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a millimeter wave sensor, and/or a vibration sensor, for example. Accordingly, a combination of MIR data and second sensor data can be used to determine or infer the environment 110, 404; and the combination of MIR data and second sensor data can be used together by the logic circuitry 806 to select the parameter.

Optionally, in some embodiments, the MIR 101 can be omitted and the second sensor 420 can provide data for determining or inferring the environment 110, 502a, 502b, 502c, 502d of the personal electronic device 402 and/or determining the parameter. For example, a camera 420 on the personal electronic device 402 can provide data to determine if a user is in the field-of-view of the camera 420, which in turn may be used by the logic circuitry 806 to determine if a user is in a region 110, 502a, 502b, 502c, 502d proximate the personal electronic device 402. In another example, a microphone 420 can provide data to indicate if the personal electronic device 402 is in a quiet environment or a noisy environment 110, 502a, 502b, 502c, 502d and/or, using voice or sound recognition technology, whether the environment 110, 502a, 502b, 502c, 502d corresponds to a conference, a class, a play, a motor vehicle, or other environment.

The at least one parameter determined by the logic circuit 806 can include at least one network parameter. In an embodiment, the at least one network 808 parameter can include at least one network access parameter. For example, the at least one network 808 parameter can include a restricted network access parameter selected to restrict network access for a personal electronic device 402 determined or inferred to be in a restricted access environment 110, 502a, 502b, 502c, 502d.

In another example, the at least one network 808 parameter can include a network call admission parameter. The network call admission parameter can be a function of a number, proportion, projected number, or projected proportion of personal electronic devices 402 assigned a restricted network access parameter. The call admission parameter can correspond to a shorter call acceptance time responsive to the call admission parameter being predictive of at least a portion of personal electronic devices 402 not being granted network 508 access. A network call admission parameter can be selected to span a network 808 or can span a cell 810 or a subset of a cell 810 (such as a beamformed subset of the cell 810).

Alternatively or additionally, the at least one network parameter can include an individual call admission parameter corresponding to a pre-admission function selected for a particular personal electronic device 402 to reduce call acceptance time responsive to a personal electronic device environment 110, 502a, 502b, 502c, 502d corresponding to a likelihood of a call being made. For example, a personal electronic device environment 110, 502a, 502b, 502c, 502d corresponding to a likelihood of a call being made can include a detected user (not shown) approaching the personal electronic device 402 or reaching for the personal electronic device 402. Alternatively, a personal electronic device environment 110, 502a, 502b, 502c, 502d corresponding to a likelihood of a call being made can include the personal electronic device 402 not being in a detected restricted network access environment 110, 502a, 502b, 502c, 502d.

Alternatively or additionally, the network 808 parameter can include a network switching parameter. For example, the network switching parameter can be selected to switch personal electronic devices 402 corresponding to a limited access parameter to a reduced bandwidth allocation.

Alternatively or additionally, the network 808 parameter can include a network forwarding parameter. The network resource can include storage 812, or the network resource can be operatively coupled to external storage (not shown). The network forwarding parameter can correspond to a logical state selected to forward to storage 812 traffic addressed to a personal electronic device 402 corresponding to a limited network access parameter such as a no answer condition. The network forwarding parameter can similarly correspond to a logical state selected to forward stored traffic from storage 812 to a personal electronic device 402. This logical state can be invoked, for example, when the network access parameter for the personal electronic device 402 changes from restricted access parameter responsive to an inference of the personal electronic device 402 leaving a restricted access environment 110, 502a, 502b, 502c, 502d.

Optionally, the network resource 802 can be further configured to output data corresponding to the MIR data received from a personal electronic device 402. Accordingly, the network resource 802 can be configured to output the data corresponding to the MIR data to the corresponding personal electronic device 402. Alternatively or additionally, the network resource 802 is configured to output the data corresponding to the MIR data to a console 814, to storage 812, or to a client or subscriber 402' other than the personal electronic device 402.

According to an embodiment, the data corresponding to the MIR data can include a location of objects (not shown) in the region 110, 502a, 502b, 502c, 502d imaged by the MIR 101 in association with a map. The network resource 802 can be configured to output the data corresponding to the MIR data as a minimally-processed representation of the MIR data. The network resource 802 can alternatively or additionally be configured to output the data corresponding to the MIR data as a processed representation of the MIR data. Alternatively or additionally, the network resource 802 can be configured to output a representation of one or more network 808 or personal electronic device 402 parameters selected or changed responsive to MIR data from the MIR 101. This representation can be displayed on the personal electronic device 402 to advise the user of a need to modify his or her expectation of network 508 or personal device 402 operation or response, for example.

As described above, the MIR data received by the network resource 802 can include information indicative of an identity characteristic of at least one person. The logic circuit 806 can be configured to infer a likelihood of a particular person being proximate the personal electronic device 402. The logic circuit 806 can be configured to select at least one operating parameter as a function of the likelihood. The identity characteristic includes a personal identity and/or an anonymous identity. The at least one person can include an owner or user 112, 412 of the personal electronic device 402. The information indicative of an identity characteristic can include at least one of body size, body mass, height, body shape, posture, body permittivity, carried articles, detectable body ornamentation, a characteristic movement, a heart rate, an intracyclic heartbeat characteristic, breathing rate, a rate or magnitude of inhalation, a rate or magnitude of exhalation, a tremor of all or part of a body, an intracyclic breathing characteristic, or an intercyclic breathing characteristic, a function thereof, or a function of two or more thereof.

The logic circuit 806 can be configured to compare the information indicative of an identity characteristic to previous information associated with the identity characteristic. The information indicative of an identity characteristic can include information related to one or more physiological parameters and one or more physical parameters.

The one or more operating parameters can include a message alert, a ringtone, a graphical user interface environment, an audio volume level, a microphone sensitivity level, on or off status of a video display, a magnification level of a video display, an unlock parameter, a lock parameter, a call forwarding parameter, a list access, an application access, a file access, or a combination thereof. The logic circuit 806 can be configured to infer a likelihood of a particular person being proximate the personal electronic device by correlating the data corresponding to the information indicative of the identity characteristic to the identity characteristic by accessing a look-up table, database, or algorithm. The network resource 802 can be configured to output data corresponding to the MIR data.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A device, comprising:
   a personal electronic device including a logic circuit;
   a communication interface operatively coupled to the logic circuit;
   at least one micro-impulse radar operatively coupled to the personal electronic device and configured to probe one or more regions near the personal electronic device to produce micro-impulse radar data, at least a portion of the micro-impulse radar being disposed inside of the personal electronic device; and
   wherein the logic circuit is configured to suspend alerts for incoming messages across the communication interface based on the micro-impulse radar data that includes:
   information about relative position of one or more persons near the user within a region of the one or more regions in a range of the at least one micro-impulse radar; and
   information about changes in position of the one or more persons relative to the user over a period of time;
   wherein the logic circuit is configured to identify the user based on one or more of a comparison of a stored phenotypic data of the user and a phenotypic data extracted from the micro-impulse radar data or based on a physical contact of the user with the personal electronic device;
   wherein the logic circuit is further configured to provide at least one operating parameter for the personal electronic device responsive to inference that the user is likely in the conference.

2. The device of claim 1, wherein the micro-impulse radar is operatively coupled to the personal electronic device via an exposed interface.

3. The device of claim 1, wherein the micro-impulse radar is located entirely inside the personal electronic device.

4. The device of claim 1, wherein the micro-impulse radar is configured to probe one or more selected subsets of the one or more regions.

5. The device of claim 1, wherein the micro-impulse radar is configured to probe one or more selected directions from the micro-impulse radar.

6. The device of claim 1, wherein the one or more regions near the personal electronic device correspond one or more regions probed by the micro-impulse radar.

7. The device of claim 1, wherein the one or more regions near the personal electronic device correspond with one or more regions not visible from the personal electronic device.

8. The device of claim 1, wherein the personal electronic device further comprises:
   a user interface operatively coupled to the logic circuit.

9. The device of claim 8, wherein the personal electronic device is configured to output a representation of one or more operating parameters selected or changed responsive to micro-impulse radar data from the micro-impulse radar.

10. The device of claim 1, wherein the logic circuit is further configured to analyze the micro-impulse radar data.

11. The device of claim 1, wherein the logic circuit is configured to determine from the micro-impulse radar data when the user is positioned to interact with the personal electronic device.

12. The device of claim 11, wherein the logic circuit is configured to determine when the user is not positioned to interact with the personal electronic device.

13. The device of claim 12, wherein the personal electronic device further comprises:
    a communication interface operatively coupled to the logic circuit;
    wherein the logic circuit is configured suspend alerts when the user is not positioned to interact with the personal electronic device.

14. The device of claim 12, wherein the personal electronic device further comprises:
    a communication interface operatively coupled to the logic circuit;
    wherein the logic circuit is configured to process incoming data according to no-answer conditions including forwarding the incoming data to at least one of a storage device and a network having storage when the user is not positioned to interact with the personal electronic device.

15. The device of claim 1, wherein the personal electronic device further comprises:
    a communication interface operatively coupled to the logic circuit and configured to communicate with a remote resource on a communication network.

16. The device of claim 1, wherein the micro-impulse radar data includes information related to a motion of one or more objects in the one or more regions.

17. The device of claim 1, wherein the micro-impulse data includes information related to one or more physiological parameters of one or more persons in the one or more regions.

18. The device of claim 1, wherein the micro-impulse data includes spectral information corresponding to the one or more regions.

19. The device of claim 1, wherein the personal electronic device further comprises:
    one or more second sensors operatively coupled to the logic circuit;
    wherein the logic circuit is configured to select one or more operating parameters for the personal electronic device responsive to data or signals from the one or more second sensors and responsive to the micro-impulse radar data.

* * * * *